Figure 1:
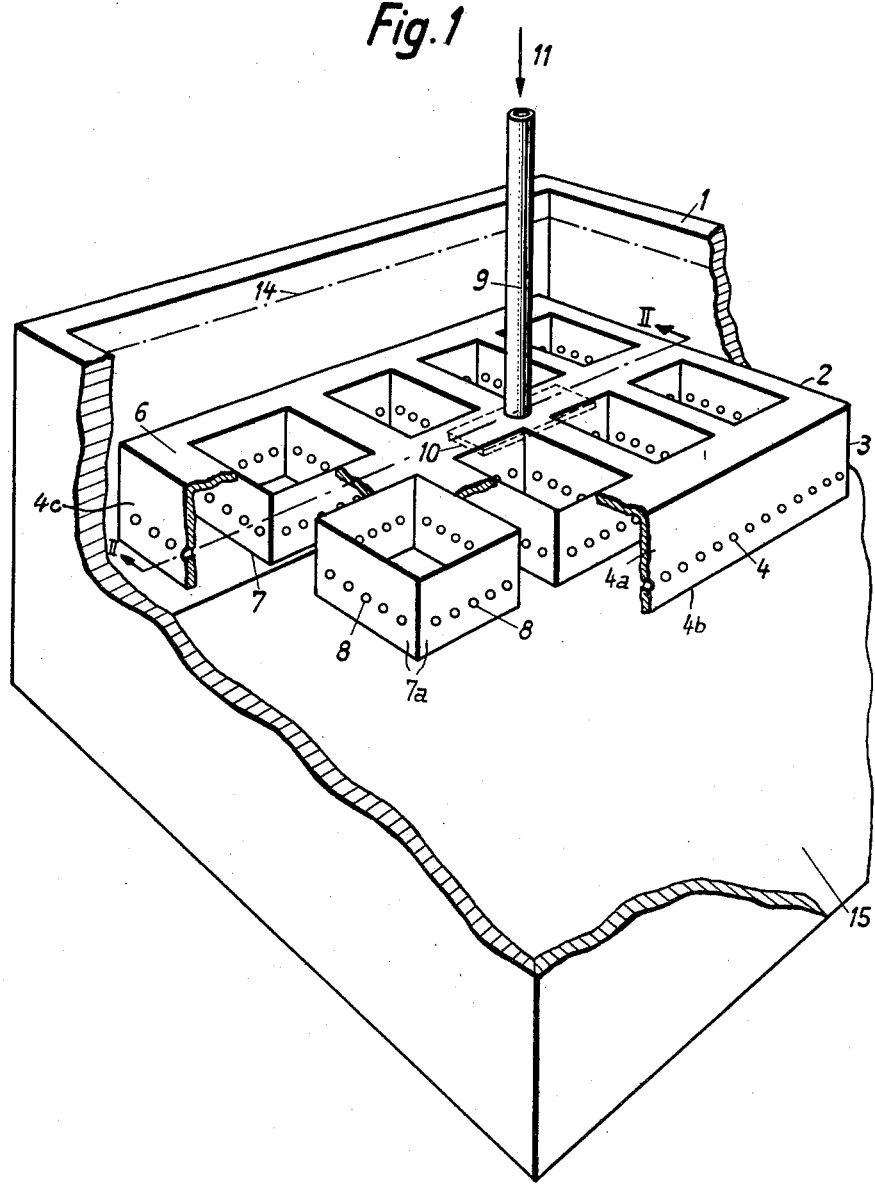

United States Patent Office 3,162,702
Patented Dec. 22, 1964

3,162,702
AERATOR FOR SEWAGE PURIFICATION
OR THE LIKE
André Yonner, Zollikon, Switzerland, assignor to L. von Roll A.G., Zurich, Switzerland, a corporation of Switzerland
Filed Oct. 20, 1961, Ser. No. 146,534
6 Claims. (Cl. 261—123)

The present invention relates to an aerator particularly suitable for a sewage purification plant operating according to the principle of the activated sludge treatment. In sewage purification plants of this type, micro-organisms are present in the sewage to be purified and cause purification of the sewage by a biological process.

It is, however, necessary for successfully achieving purification that sufficient air or oxygen is supplied to the sewage. A number of proposals have been made for supplying an adequate quantity of air to a sewage purification plant operating according to the activated sludge process. In a number of such plants, the air is supplied to the base of the purification tank which holds the sewage to be treated. In such a case, the air must be supplied to the tank under a pressure which at least corresponds to the hydrostatic pressure of the water at the bottom of the tank. While plants of this type operate satisfactorily, they are unsatisfactory from the economic point of view since the production of air under sufficient pressure is very costly. Additionally, a further process known to the art provides for the supplying of air to one side of the tank, with the entire contents of said tank being circulated at the same time. Experience has shown, however, that the rate of circulation at the tank bottom may be inadequate in plants of this type.

The present invention accordingly has for one of its primary objects to provide a purification plant operating on the activated sludge principle in which the disadvantages hereinabove recited are avoided.

Another important object of the present invention is to provide aerator means adapted for use in a purification system which reliably and efficiently permits proper circulation and aeration of the medium undergoing treatment.

A further important object of the present invention is to provide aerator means of relatively simplified construction, permitting operation to be performed reliably and economically in a relatively simplified manner.

Yet a further important object of the present invention is to provide aerator means, particularly suitable for sewage purification, which are not readily subject to clogging and, accordingly, are capable of operating in an efficient and trouble free manner.

Still a further important object of the present invention is to provide an aerator construction which is relatively simple and economical to manufacture, easy to install in a purification tank, and capable of operating in a reliable and efficient manner.

More particularly, the invention is designed to provide a purification plant in which the air can be supplied at comparatively low pressure while adequate circulation of the contents of the purification tank is ensured so as to achieve efficient purification of the sewage in a comparatively short time. The purification plant designed according to the present invention is featured by the provision of at least one insert member defining an aerator unit which is open at the bottom and is located in the tank accommodating the sewage to be purified. The housing of the aerator unit is provided with one or more vertically arranged flow ducts defined by aerating boxes open at the top and at the bottom and having partially perforated side walls, and with at least one air supply conduit extending below the upper surface of the aerator unit.

Still further objects and the entire scope of applicability of the present invention will become apparent from the detailed description given hereinafter; it should be understood, however, that the detailed description and specific example, while indicating a preferred embodiment of the invention, is given by way of illustration only, since various changes and modifications within the spirit and scope of the invention will become apparent to those skilled in the art from this detailed description.

Figure 2:
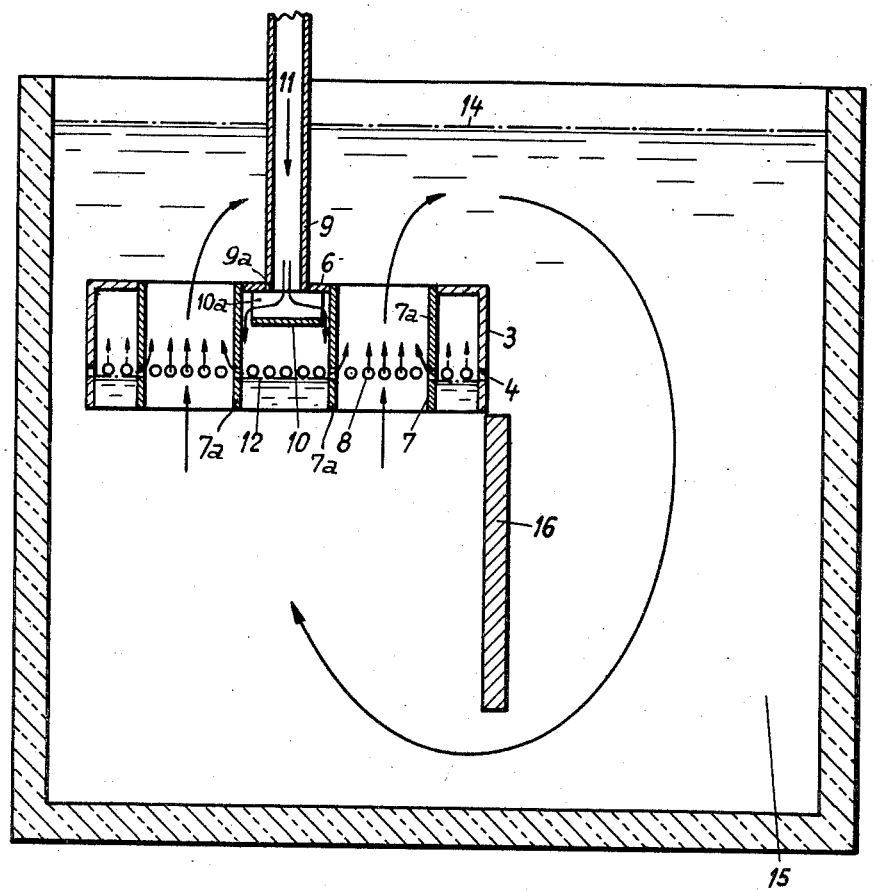

In the drawings:

FIGURE 1 is a perspective view, partially in section, of a preferred embodiment of the areator means for a sewage purification plant; and FIGURE 2 is a cross-sectional view of the aerator unit shown in FIGURE 1 and taken along lines II—II thereof showing such aerator unit as employed in a purification tank.

Referring now to the drawings and more particularly to FIGURE 1, the reference numeral 1 designates a purification tank, which may be formed of concrete and is adapted to hold the sewage to be purified. In order to render the drawing more understandable, the sewage supply and outlet lines have not been indicated, whereas a portion of the walls of the purifying tank 1 have been broken away in FIGURE 1 so as to reveal the interior thereof. Located in the interior of the tank 1 is an insert member serving as an aerator unit and generally designated by reference numeral 2. This insert member consists of a suitably shaped housing body or container member 3 which is open at its lower or bottom end, with the side walls 4a and end walls 4c thereof being provided with a number of openings or apertures 4. Incorporated in the top wall or plate member 6 of the container 3 are open-ended aeration boxes or units 7, the cross-section of which is preferably rectangular, although other configurations are obviously contemplated. These aeration boxes or units 7 are defined by side walls 7a which surround openings in the top wall 6 and depend downward substantially to the lower edge 4b of the container 3. The open-ended aeration boxes 7 are disposed in a checkerboard-like arrangement and largely fill the surface of the tank. It has proven desirable, however, that the aerator unit should not exceed more than one-half of the cross-section of the purification tank to provide for proper circulation of the sewage. Since the aeration units 7 are spaced from one another and from the side and end walls 4a and 4c, a plurality of intersecting flow ducts are formed within the container 3. One set of flow ducts extends between the opposed side walls 4a, 4a while the other set of flow ducts extends between the opposed end walls 4c, 4c.

Below the top or upper wall 6 a row of openings or apertures 8 are provided, by way of example, in each side wall 7a of the aeration boxes 7, with said openings 8 being bored or forced through as by punching. The aerator unit may, by way of example, be supported by an air supply line or conduit 9 which terminates below the top wall or plate member 6 of the container 3 of the aerator.

Reference is made to FIGURE 2 for a more detailed illustration of the structure of the aerator unit. In this figure it is clearly shown that the air line 9, as designed, ends below the top wall or plate 6 of the container 3. In addition, a number of aeration boxes or units 7 provided at their side walls 7a with bores 8 is shown. Arranged at a certain distance below the mouth 9a of the air supply line 9 is a laterally directed baffle plate 10 which enables the air to be evenly distributed. By virtue of the wide mouth outlet of the baffle arrangement 10, there is little or no likelihood that the supply system will become stopped-up due to foreign particles collecting therein, as the air pressure is sufficient to blow out such particles when the supply means, such as a conventional pump unit or compressor, is actuated. The outlet mouth 10a may advantageously be designed as a rectangular member or cube having a pair of open and diametrically opposed sides, to permit unobstructed feed of air to the confines of the enclosed space of the container 3.

In operation, air under pressure is supplied to the container 3 in the direction of the arrow 11. The air will thus at least partially force out the water located within the confines of the container 3, by way of example down to the level of the dot-dash line designated by reference numeral 12 in FIGURE 2. The sewage to be treated, on the other hand, is still in the interior space defined by the side walls 7a which form the open-ended flow ducts between aeration boxes 7 and its level in the purification tank is located, by way of example, at the dot-dash line 14 (FIGURE 1), i.e. above the top edge of the openings 8 provided for the aeration boxes 7. The air will then be forced through the openings 8 into the interior of the aeration boxes 7 and then through the openings 4 into the outer region surrounding the container 3, thus charging or inoculating the sewage with oxygen. The rising air bubbles cause a difference in the density of the water columns in the aeration boxes 7 and around the container 3 so that the sewage is caused to circulate in a manner commonly described as the air-lift pump principle. The air-water mixture rises so that additional sewage will flow into the flow ducts from below so as to be aerated in the same manner just described. The complete water content of the aeration tank is thus circulated.

The entire container 3 of the aerator unit fills only part of the purification tank. As seen in FIGURE 2, the aerator unit is located in one-half of the tank 1 while the other half has an empty cross-sectional space generally designated at 15. The water portions charged with air, which rise in and through the aeration boxes 7, will then again move in the downward direction through the unoccupied region 15 of the tank 1 so that the air is also carried into the zones of the tank 1 located below the container 3. The portion of the tank occupied by the container 3 is preferably at best of the same size as, but commonly smaller than, the remaining unoccupied cross-sectional area 15 of the tank 1.

In order to ensure that an optimum formation of the circulatory movement of the sludge-inoculated sewage will take place, guide baffles or partitions 16 may be provided in the tank 1 at one side wall of the container 3, as clearly indicated in FIGURE 2.

The entire aerator unit is preferably located in the upper third of the tank so that the air need be supplied to the supply line 9 only under a pressure corresponding to one-third of the hydrostatic pressure appearing at the bottom of the tank. It has also been found advantageous to arrange the apertures 4 of the container and the apertures 8 of the aeration boxes 7 in a common horizontal plane. Moreover, the air apertures provided for the aeration boxes and the container side wall may naturally be designed to partake any desired shape.

It should thus be readily apparent that the aerator unit of the present invention is readily suitable for aerating a medium undergoing purification, such as in a sewage purification system. By providing flow duct means open at its ends for each aerator unit, proper circulation and aeration of the sewage can be ensured since an unobstructed flow path through the aerator is provided.

Having thus described the nature of the present invention what is desired to be secured by United States Letters Patent, is:

1. In a sewage purification system, the combination of:
a tank for containing a medium to undergo purification;
an aerator disposed within said tank;
said aerator including container means provided with top, side and end walls;
said side and end walls having spaced apertures therein;
said top wall having a plurality of discrete shaped openings therein between said side walls and end walls;
each of said openings being surrounded by substantially vertical walls which depend from said top wall and thus form an aeration unit having aligned upper and lower openings therein;
said aeration unit walls having holes therein;
said aeration units being spaced inwardly from said side walls to define first flow ducts extending between said end walls;
said aeration units also being spaced inwardly from said end walls to define second flow ducts extending between said side walls;
said first and second flow ducts intersecting one another;
said flow ducts having a closed upper end formed by said top wall and an open lower end to permit said medium to enter thereinto; and
means for supplying a quantity of air into at least one of said flow ducts to force the medium therein downwardly below said holes whereby air may move freely through said flowducts and exhaust through said apertures and holes thereby circulating through and purifying said medium;
said container means having a cross-sectional area no more than one-half the cross-sectional area of said tank;
said aerator being offset within one-half of said tank to leave an unoccupied portion within said tank whereby said exhausting air will rise through said aeration units and move downward into the unoccupied portion.

2. The combination defined in claim 1 wherein the height of said aeration unit walls is substantially equivalent to the height of said side and end walls.

3. The combination defined in claim 1 wherein said means includes an air supply line attached to said top wall.

4. The combination defined in claim 3 but further characterized by a baffle within said aerator disposed beneath said air supply line.

5. The combination defined in claim 1 but further characterized by a baffle plate disposed within said tank beneath sead aerator and substantially parallel to said side wall of said container means.

6. The combination as defined in claim 1 wherein the disposition of said aerator in said tank is within the upper third thereof.

References Cited by the Examiner

UNITED STATES PATENTS

| 129,397 | 7/72 | Cornell | 261—124 |
| 2,011,598 | 8/35 | Teckemeyer et al. | 261—121 |
| 2,126,228 | 8/38 | Streander | 210—220 |
| 2,708,571 | 5/55 | Fischerstrom et al. | 261—124 |
| 2,818,326 | 12/57 | Eastman et al. | 261—121 |

FOREIGN PATENTS

| 25,298 | 11/10 | Great Britain. |
| 9,870 | 3/16 | Great Britain. |
| 813,995 | 9/51 | Germany. |
| 1,129,774 | 9/56 | France. |

GEORGE D. MITCHELL, *Primary Examiner.*

HERBERT L. MARTIN, *Examiner.*